United States Patent
Gerber et al.

(10) Patent No.: US 9,349,035 B1
(45) Date of Patent: May 24, 2016

(54) MULTI-FACTOR AUTHENTICATION SENSOR FOR PROVIDING IMPROVED IDENTIFICATION

(71) Applicant: Maxim Integrated Products, Inc., San Jose, CA (US)

(72) Inventors: Stephen C. Gerber, Austin, TX (US); Ronald B. Koo, Los Altos, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 14/493,623

(22) Filed: Sep. 23, 2014

Related U.S. Application Data

(60) Provisional application No. 62/011,702, filed on Jun. 13, 2014.

(51) Int. Cl.
G06K 9/28 (2006.01)
G06K 9/00 (2006.01)

(52) U.S. Cl.
CPC ................................. G06K 9/0002 (2013.01)

(58) Field of Classification Search
None
See application file for complete search history.

(56) References Cited

U.S. PATENT DOCUMENTS

| | | | |
|---|---|---|---|
| 4,394,773 A * | 7/1983 | Ruell | A61B 5/1172 310/318 |
| 6,643,531 B1 * | 11/2003 | Katarow | A61B 5/1172 600/323 |
| 6,703,918 B1 * | 3/2004 | Kita | 340/5.52 |
| 2012/0092294 A1 * | 4/2012 | Ganapathi | G02B 26/0833 345/174 |
| 2013/0106813 A1 * | 5/2013 | Hotelling et al. | 345/207 |
| 2013/0160141 A1 * | 6/2013 | Tseng et al. | 726/28 |
| 2014/0366128 A1 * | 12/2014 | Venkateswaran et al. | 726/19 |
| 2015/0030217 A1 * | 1/2015 | Wickboldt | G06K 9/00026 382/124 |
| 2015/0043792 A1 * | 2/2015 | Nada | G06K 9/0006 382/126 |

* cited by examiner

Primary Examiner — Brian P Werner
(74) Attorney, Agent, or Firm — Advent, LLP

(57) ABSTRACT

A mobile device configured to authenticate a user, an authentication system, and method for use of the mobile device and authentication system are described that include a biometric sensor, a touchscreen sensor, and/or a fingerprint sensor, where the biometric sensor, the touchscreen sensor, and/or the fingerprint sensor are coupled to a controller configured to authenticate a computing device user. In implementations, the mobile device that employs example techniques in accordance with the present disclosure includes an authentication device, including a biometric sensor configured to receive biometric information from the user; and a fingerprint sensor configured to receive fingerprint information from the user; and a controller configured to authenticate the user, where the authentication device, including the biometric sensor and the fingerprint sensor, is coupled to the controller.

20 Claims, 5 Drawing Sheets

100 MOBILE DEVICE

102 AUTHENTICATION SENSING DEVICE

104 TOUCHSCREEN SENSOR

108 BIOMETRIC SENSOR

110 FINGERPRINT SENSOR

106 INPUT DEVICE

112 CONTROLLER

FIG. 1D

112 CONTROLLER

114 PROCESSOR

116 COMMUNICATIONS MODULE

118 MEMORY

FIG. 1E

MULTI-FACTOR AUTHENTICATION SENSOR FOR PROVIDING IMPROVED IDENTIFICATION

BACKGROUND

Mobile devices are prevalent in today's technology. A mobile device can include a relatively small, handheld computing device typically with a display screen with touch input or a miniature keyboard, for example a smartphone, a smartwatch, or a tablet computer. Mobile devices have an operating system that can run various types of software applications. Many mobile devices are equipped with cellular, Bluetooth, GPS, and/or Wi-Fi capability that allows connection to the Internet or other devices.

SUMMARY

A mobile device configured to authenticate a user, an authentication system, and method for use of the mobile device and authentication system are described that include a biometric sensor, a touchscreen sensor, and/or a fingerprint sensor, where the biometric sensor, the touchscreen sensor, and/or the fingerprint sensor are coupled to a controller configured to authenticate a computing device user. In implementations, the mobile device that employs example techniques in accordance with the present disclosure includes an authentication device, including a biometric sensor configured to receive biometric information from the user; and a fingerprint sensor configured to receive fingerprint information from the user; and a controller configured to authenticate the user, where the authentication device, including the biometric sensor and the fingerprint sensor, is coupled to the controller. In implementations, the authentication system that employs example techniques in accordance with the present disclosure includes an authentication device, including a biometric sensor configured to receive biometric information from the user; a fingerprint sensor configured to receive fingerprint information from the user; and a touchscreen sensor configured to receive input from a user; and a controller configured to determine an authentication level and authenticate the user, where the authentication device, including the biometric sensor, the fingerprint sensor, and the touchscreen sensor, is coupled to the controller. In implementations, a process for utilizing the mobile device and/or the authentication system that employs example techniques in accordance with the present disclosure includes determining an authentication level required for a mobile device, the mobile device including an authentication sensing device having at least two of a touchscreen sensor, a biometric sensor, or a fingerprint sensor; receiving at least two of touchscreen sensor information from the touchscreen sensor, the touchscreen sensor information based on a determined authentication level; biometric sensor information from the biometric sensor, the biometric sensor information based on the determined authentication level; or fingerprint sensor information from the fingerprint sensor, the fingerprint sensor information based on the determined authentication level; and determining authentication for the mobile device based on received sensor information; and determining authentication for the mobile device based on received sensor information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

FIG. 1D is a diagram illustrating an embodiment of a computing device and sensing device that includes a biometric sensor for increased authentication, in accordance with an example implementation of the present disclosure.

FIG. 1E is a diagram illustrating an embodiment of a controller for a computing device and sensing device that includes a biometric sensor for increased authentication, in accordance with an example implementation of the present disclosure.

DETAILED DESCRIPTION

Overview

Figure 1A:
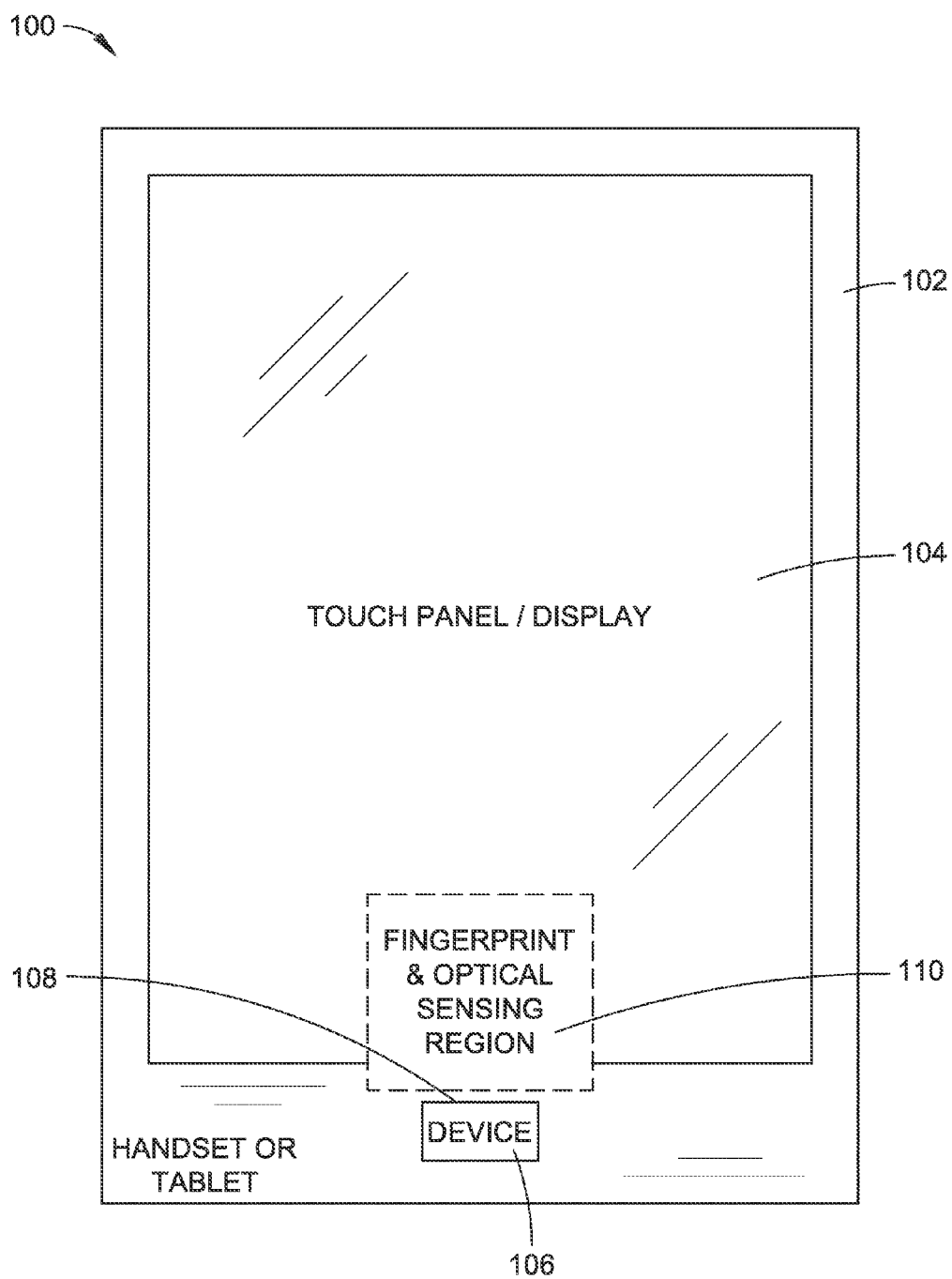
FIG. 1A is a diagrammatic view illustrating an embodiment of a computing device and sensing device that includes a biometric sensor for increased authentication, in accordance with an example implementation of the present disclosure.

Many mobile devices include a touchscreen that can function as an input and/or a display device. A touchscreen can include an electronic visual display that a user can control through simple or multi-touch gestures by touching the touchscreen with a stylus and/or one or more fingers. In implementations, a touchscreen can detect the presence, location, and/or pressure of a touch within the display area, generally by a finger, hand, stylus, pen, or other pointing device. The touchscreen enables the user to interact with a display panel directly without requiring any intermediate device, instead of indirectly with a mouse or touchpad. In addition to mobile device use, touchscreens can be implemented in computers or as terminals to access networks. The user can use the touchscreen to react to what is displayed and to control how it is displayed.

Fingerprint sensors detect the unique ridge patterns on a finger for the purpose of identification and/or authentication. They can include standalone devices and/or components integrated in a system, such as a laptop computer. Additionally, fingerprint sensors are often incorporated into smartphones or other mobile devices either in the home button or on the back side.

Pulse oximeters measure blood oxygen saturation level and heart rate through optical sensors or other means. Similar to fingerprint sensors, they can be standalone devices or can be integrated into a detection system. Similar to fingerprint sensors, pulse oximeters can be incorporated into smartphones or other mobile devices. Analysis of a pulse oximeter photoplethysmograph waveform can determine some biometric information, such as heart rate variation and condition of the arteries. One example of an optical biometric sensor can include a pulse oximeter.

Many mobile devices require a fingerprint, input of a passcode, or other authentication in order to access the computing device and/or software application. However, some authentication security, such as fingerprint authentication security, may be compromised by spoofing, which can include deceiving an authentication sensor. Further, mobile device size constraints may not provide adequate space for certain sensor combinations or provide sufficient fingerprint authentication security, and the sensors (some biometric sensing devices and electronic field touch devices) may not integrate well in a small space.

Accordingly, a mobile device configured to authenticate a user, an authentication system, and method for use of the mobile device and authentication system are described that include a biometric sensor, a touchscreen sensor, and/or a fingerprint sensor, where the biometric sensor, the touchscreen sensor, and/or the fingerprint sensor are coupled to a controller configured to authenticate a computing device user. In implementations, the mobile device that employs example techniques in accordance with the present disclosure includes an authentication device, including a biometric sensor configured to receive biometric information from the user; and a fingerprint sensor configured to receive fingerprint information from the user; and a controller configured to authenticate the user, where the authentication device, including the biometric sensor and the fingerprint sensor, is coupled to the controller. In implementations, the authentication system that employs example techniques in accordance with the present disclosure includes an authentication device, including a biometric sensor configured to receive biometric information from the user; a fingerprint sensor configured to receive fingerprint information from the user; and a touchscreen sensor configured to receive input from a user; and a controller configured to determine an authentication level and authenticate the user, where the authentication device, including the biometric sensor, the fingerprint sensor, and the touchscreen sensor, is coupled to the controller. In implementations, a process for utilizing the mobile device and/or the authentication system that employs example techniques in accordance with the present disclosure includes determining an authentication level required for a mobile device, the mobile device including an authentication sensing device having at least two of a touchscreen sensor, a biometric sensor, or a fingerprint sensor; receiving at least two of touchscreen sensor information from the touchscreen sensor, the touchscreen sensor information based on a determined authentication level; biometric sensor information from the biometric sensor, the biometric sensor information based on the determined authentication level; or fingerprint sensor information from the fingerprint sensor, the fingerprint sensor information based on the determined authentication level; and determining authentication for the mobile device based on received sensor information; and determining authentication for the mobile device based on received sensor information.

Example Implementations

FIGS. 1A through 1E illustrate a multi-factor authentication device 100 in accordance with an example implementation of the present disclosure. The multi-factor authentication device 100 can include a mobile device and/or an authentication system. As shown in FIGS. 1A through 1E, the multi-factor authentication device 100 can include a device configured to function as a computing device for determining multi-factor authentication using at least two sensors. In some implementations, a multi-factor authentication device 100 having a touchscreen can include an electronic visual display that a user can control through simple or multi-touch gestures by touching the screen with a finger and/or stylus. Some examples of a multi-factor authentication device 100 can include portable devices and/or mobile devices, such as a tablet computer, wearable device, and/or a smart phone. Other examples can include desktop-type or network computing devices. Additionally, the multi-factor authentication device 100 can include at least one input device 106 (e.g., a button, a switch, a keyboard, a mouse, etc.).

The multi-factor authentication device 100 can include an authentication sensing device 102, which can further include a touchscreen sensor 104, a fingerprint sensor 110, and/or a biometric sensor 108. In implementations, the touchscreen sensor 104, the fingerprint sensor 110, and/or the biometric sensor 108 can be disposed adjacent to each other (e.g., disposed in the same package). For example, a touchscreen sensor 104, a fingerprint sensor 110, and/or a biometric sensor can be in an integrated backside chip-on-glass configuration. In this configuration, the integrated authentication sensing device 102 is disposed on the backside of the touchscreen glass. In some other implementations, the biometric sensor 108, the fingerprint sensor 110, and/or the touch screen sensor 104 are included as simple modules on the backside of the multi-factor authentication device 100. In other implementations, at least one of the touchscreen sensor 104, the fingerprint sensor 110, and the biometric sensor 108 may not be adjacent to the other sensors. For example, a fingerprint sensor 110 and/or a biometric sensor 108 may include a standalone configuration. In this example, the fingerprint sensor 110 and/or the biometric sensor 108 can be coupled to the multi-factor authentication device 100 using wireless (e.g., Bluetooth) technology and/or can be wired (e.g., a USB connection).

The authentication device may include a touchscreen sensor 104. The touchscreen sensor 104 can be configured to utilize capacitive technology, for example a capacitive touchscreen panel. In implementations, a capacitive touchscreen panel can include an insulator (e.g., glass, etc.) patterned with a transparent conductor (e.g., indium tin oxide). When a stylus and/or finger contacts the touch screen surface, a distortion of the screen's electrostatic field can be measurable as a change in capacitance. The capacitance data and/or location of the electrostatic field distortion can then be sent to a controller (e.g., controller 112) to process the information. In a specific embodiment, the controller 112 can require a user to enter a passcode or other identifying information using the touchscreen technology. In other implementations, the touchscreen sensor 104 can include a resistive touchscreen, an infrared touchscreen, and/or an optical touchscreen.

The authentication sensing device 102 may include a fingerprint sensor 110. The fingerprint sensor 110 can include an electronic device configured to capture a digital image of a fingerprint pattern. Some examples of a fingerprint sensor can include an optical sensor (e.g., a digital camera, which can also include and/or function as an image sensor), a capacitance fingerprint sensor, and/or an ultrasonic fingerprint sensor. In one specific embodiment, a fingerprint sensor 110 includes an optical fingerprint sensor that can include a top layer (e.g., glass), which can include a touch surface (e.g., the surface where a finger is placed). A light source can be below (e.g., a side of the glass distal from the side configured to be touched) the top layer or touch surface for illuminating the finger (e.g., an LED, an organic LED, a backlight, etc.). The light reflected from the finger can pass directly to a sensor (e.g., a charge-coupled device (CCD), an array of solid-state pixels, etc.), which can capture a visual image and/or representation of the fingerprint. Another example of a fingerprint sensor 110 can include a capacitance-type and/or an electrostatic-type fingerprint sensor 110. A capacitance-type fingerprint sensor 110 can include a sensor pixel array, where each pixel acts as one plate of a capacitor, the dermal layer (which is electrically conductive) acts as the other plate, and the non-conductive epidermal layer acts as a dielectric. In this example, a fingerprint image and/or representation can be formed using the capacitance of the sensor pixel array and the electric field caused by the user's fingerprint. Other examples of a fingerprint sensor can include a passive capacitance sensor, an active capacitance sensor, or an ultrasonic sensor, etc. The fingerprint image and/or representation derived from fingerprint sensor 110 may then be compared/matched with a known fingerprint in a fingerprint database for authentication purposes using a controller 112 to determine the degree of a match. In one specific embodiment, the fingerprint sensor 110 can be integrated with a touchscreen sensor 104 and can serve as a dual-purpose fingerprint and touch-control surface.

Additionally, the authentication sensing device 102 may include a biometric sensor 108. A biometric sensor 108 can include a sensor configured to detect quantifiable metrics related to human characteristics and traits. In one embodiment, a biometric sensor 108 can include an optical biometric sensor capable of detecting pulse and blood oxygen levels (e.g., a pulse oximeter). Other examples of a biometric sensor 108 can include a sensor configured to detect a blood vessel pattern in a user's finger and/or palm, a voice recognition sensor, an iris/retina scanner and/or sensor, a sensor configured to utilize facial recognition and detect a user's facial shape (e.g., a camera), and/or a detector configured to detect the shape of a photoplethysmograph. In a specific embodiment shown in FIG. 1A, the biometric sensor 108 can be disposed in an area of the multi-factor authentication device 100 where optical and electrostatic areas overlap (e.g., a fingerprint sensor and a biometric sensor overlap). In this embodiment, the biometric(s) detected by biometric sensor 108 (e.g., an individual pulse and EKG signature) can be compared with baseline data and determined to match or not match an authorized user (similar to sensing and analyzing a fingerprint) by using controller 112, which is configured to authenticate a user. In this embodiment, a user can place a finger over the overlapping optical and electrostatic sensing area, which can simultaneously detect biometric data via the biometric sensor 108 and the fingerprint sensor 110, which overlap. In some implementations, the biometric sensor 108 can include a stand-alone configuration where the biometric sensor 108 is communicatively coupled to the multi-factor authentication device 100 via wireless technology (e.g., Bluetooth) and/or wired means (e.g., a USB connection).

In some implementations, the biometric sensor 108 can be only enabled when higher security authentication is desired, such as for a commerce transaction and not enabled for a determined lower security authentication. This specific implementation may provide an increased authentication requirement as well as power savings when compared to a simple pass-code access entry and can be useful when unlocking a multi-factor authentication device 100 (e.g., a smart phone) from a display-off state. Higher security authentication may be desired when access is required to an important device and/or software application, which can be determined by the user. Conversely, a lower security authentication may be required for a less important device and/or software application (e.g., access to a smartphone device, access to a game), which can also be determined by the user.

In some implementations, the biometric sensor 108 can include a light source, such as a light-emitting diode (LED) and/or an organic LED. In one embodiment, the light source for the biometric sensor 108 can be disposed within and/or adjacent to the biometric sensor 108 and/or the authentication sensing device 102. In other embodiments, the light source can include the display light (e.g., a backlight, etc.) as the light source. In these embodiments, a user's finger can be placed over the light source and/or a nearby/adjacent biometric sensor 108.

Figure 1B:
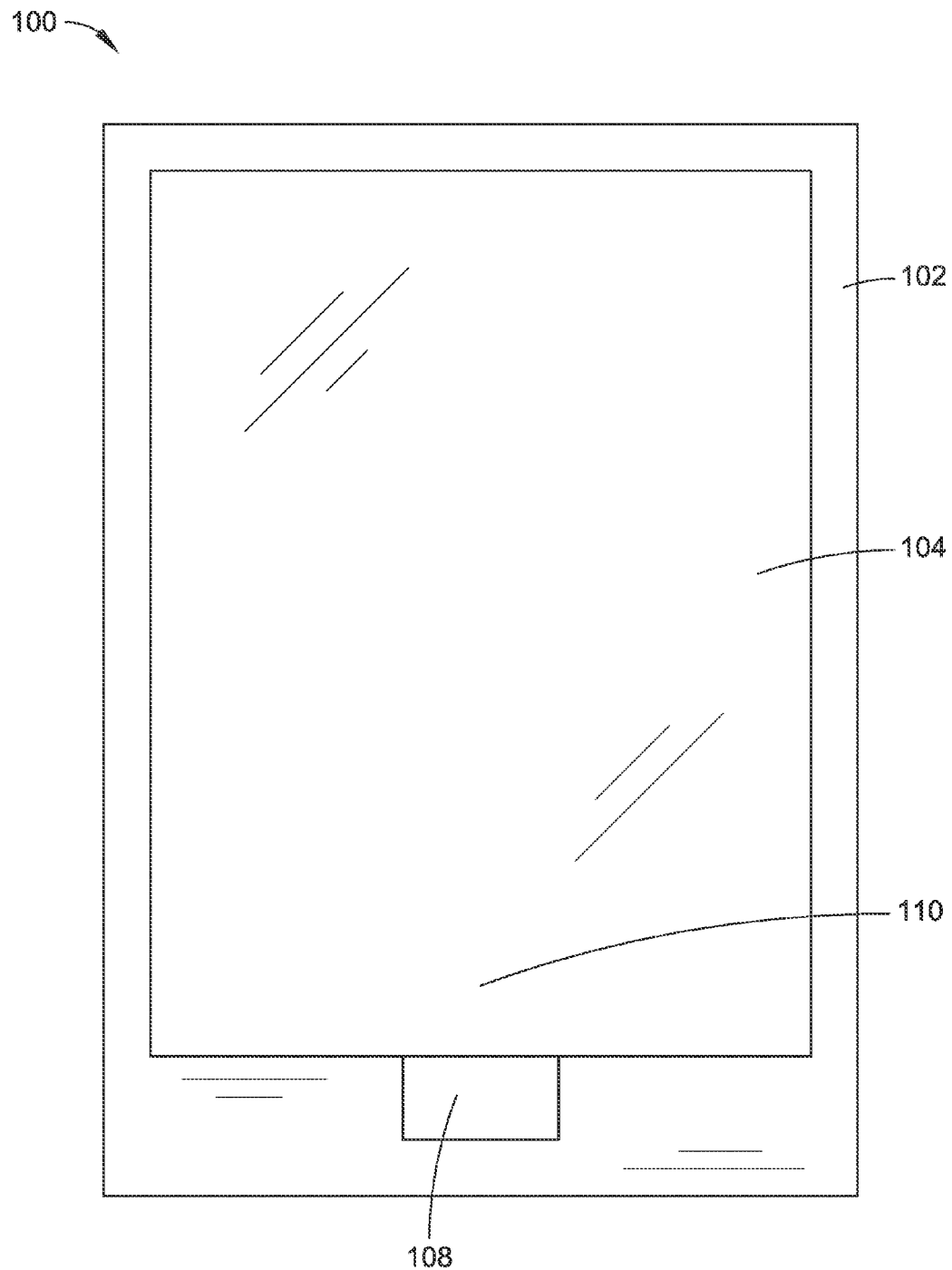
FIG. 1B is a diagrammatic view illustrating an embodiment of a computing device and sensing device that includes an integrated fingerprint and touchscreen sensor and biometric sensor for increased authentication, in accordance with an example implementation of the present disclosure.
Figure 1C:
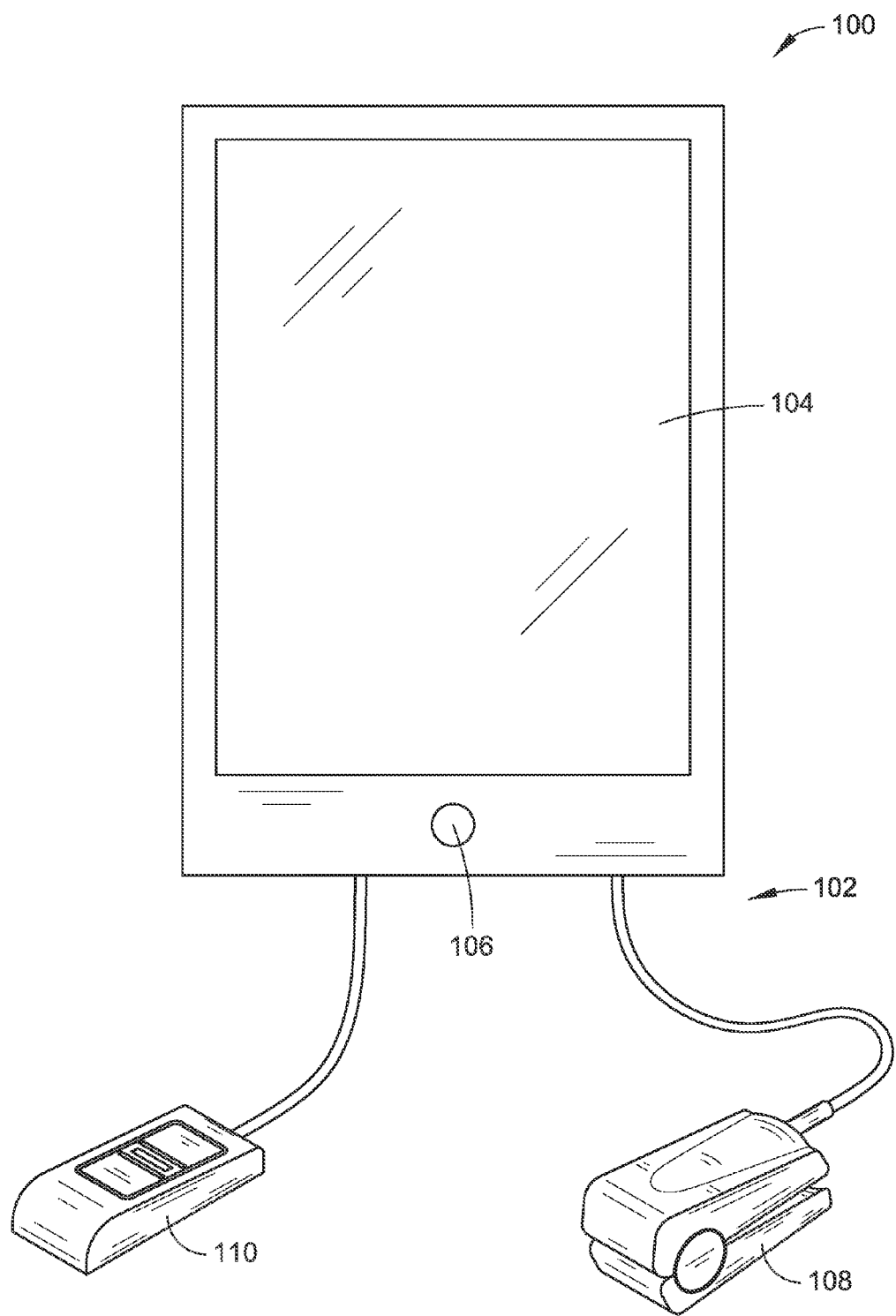
FIG. 1C is a diagrammatic view illustrating an embodiment of a computing device and authentication sensing device that can include a fingerprint sensor, a touchscreen sensor, and/or a biometric sensor for increased authentication, in accordance with an example implementation of the present disclosure.

The biometric sensor 108, the fingerprint sensor 110, and/or the touch screen sensor 104 can be implemented in a single package or a combination of integrated and/or discrete components. In one embodiment and as shown in FIG. 1B, the authentication sensing device 102 can include an integrated fingerprint sensor 110 and touchscreen sensor 104. In implementations, an integrated fingerprint sensor 110 and touchscreen sensor 104 can include a single physical device that includes both sensors capable of detecting a fingerprint and receiving entered information, such as a passcode or a finger swipe, on a touchscreen surface. One example of the integrated touchscreen sensor 104 and fingerprint sensor 110 includes a touchscreen with a portion of the touchscreen configured to accept fingerprint information from a user's finger when the finger is placed on the portion of the touchscreen (proximate to fingerprint sensor 110) configured to accept fingerprint information, while the touchscreen (e.g., touchscreen sensor 104) is also configured to receive a passcode entered by the user. In another embodiment and as shown in FIG. 1C, the authentication sensing device 102 can include standalone sensors that are communicably and/or electrically coupled to the multi-factor authentication device 100. In the specific embodiment shown in FIG. 1C, a multi-factor authentication device 100 includes an authentication sensing device 102 with a portable fingerprint sensor 110, a portable biometric sensor 108 (e.g., a pulse oximeter), and a touchscreen sensor 104, where the fingerprint sensor 110 and the biometric sensor 108 are wired to the multi-factor authentication device 100, using for example a USB-type cable. In other implementations, a portable fingerprint sensor 110 and a portable biometric sensor 108 may be configured to have wireless capability, such as Bluetooth connectivity.

As shown in FIGS. 1D and 1E, the multi-factor authentication device 100 and/or authentication sensing device 102 can include a controller 112 configured to authenticate a user. In some implementations, the controller 112 can include an electrostatic drive. The controller 112 may further include a processor 114, a communications module 116, and/or memory 118. In implementations, the processor 114 can provide processing functionality for the controller 112 and may include any number of processors, micro-controllers, or other processing systems and resident or external memory for storing data and other information accessed or generated by the controller 112. The processor may execute one or more software programs, such as an authentication algorithm, which implement techniques described herein. The processor 114 is not limited by the materials from which it is formed or the processing mechanisms employed therein, and as such, may be implemented via semiconductor(s) and/or transistors (e.g., using electronic integrated circuit (IC) components), and so forth.

The communications module 116 can be operatively configured to communicate with components of the authentication sensing device 102, the multi-factor authentication device 100, and/or system host. The communications module 116 can also be communicatively coupled with the processor 114 (e.g., for communicating inputs from the authentication sensing device 102 and/or the multi-factor authentication device 100 to the processor 114). The communications module 116 and/or the processor 114 can also be configured to communicate with a variety of different networks, including the Internet, a cellular telephone network, a local area network (LAN), a wide area network (WAN), a wireless network, a public telephone network, and/or an intranet, for example. In one implementation, the communications module 116 can include sensing lines between the biometric sensor 108, the fingerprint sensor 110, the touch screen sensor 104, and/or other components of the multi-factor authentication device 100.

The memory 118 is an example of tangible computer-readable media that provides storage functionality to store various data associated with operation of the controller 112, such as software programs and/or code segments, algorithms, or other data to instruct the processor 114 and/or other components of the controller 112 to perform the steps described herein. Thus, the memory 118 can store data, such as a program of instructions for operating a multi-factor authentication device 100 and/or authentication system 102 (including its components), data, and so on. Although a single memory 118 is described, a wide variety of types and combinations of memory (e.g., tangible memory, non-transitory) may be employed. The memory 118 may be integral with the processor 114, may comprise stand-alone memory, or may be a combination of both.

The memory 118 may include removable and non-removable memory components, such as Random Access Memory (RAM), Read-Only Memory (ROM), Flash memory (e.g., a Secure Digital (SD) memory card, a mini-SD memory card, and/or a micro-SD memory card), magnetic memory, optical memory, a Universal Serial Bus (USB) memory device, hard disk memory, external memory, and other types of computer-readable storage media. In implementations, the authentication sensing device 102 and/or the multi-factor authentication device 100 and/or memory 118 may include removable Integrated Circuit Card (ICC) memory, such as memory provided by a Subscriber Identity Module (SIM) card, a Universal Subscriber Identity Module (USIM) card, a Universal Integrated Circuit Card (UICC), and so on.

The multi-factor authentication device 100 and authentication sensing device 102 can function to provide varying levels of authentication in the same device using the biometric sensor 108, the touchscreen sensor 104, and/or fingerprint sensor 110 (simultaneous multi-factor biometric authentication) that can protect a multi-factor authentication device 100 and/or software application on the multi-factor authentication device 100 from spoofing.

Example Processes

Figure 2:
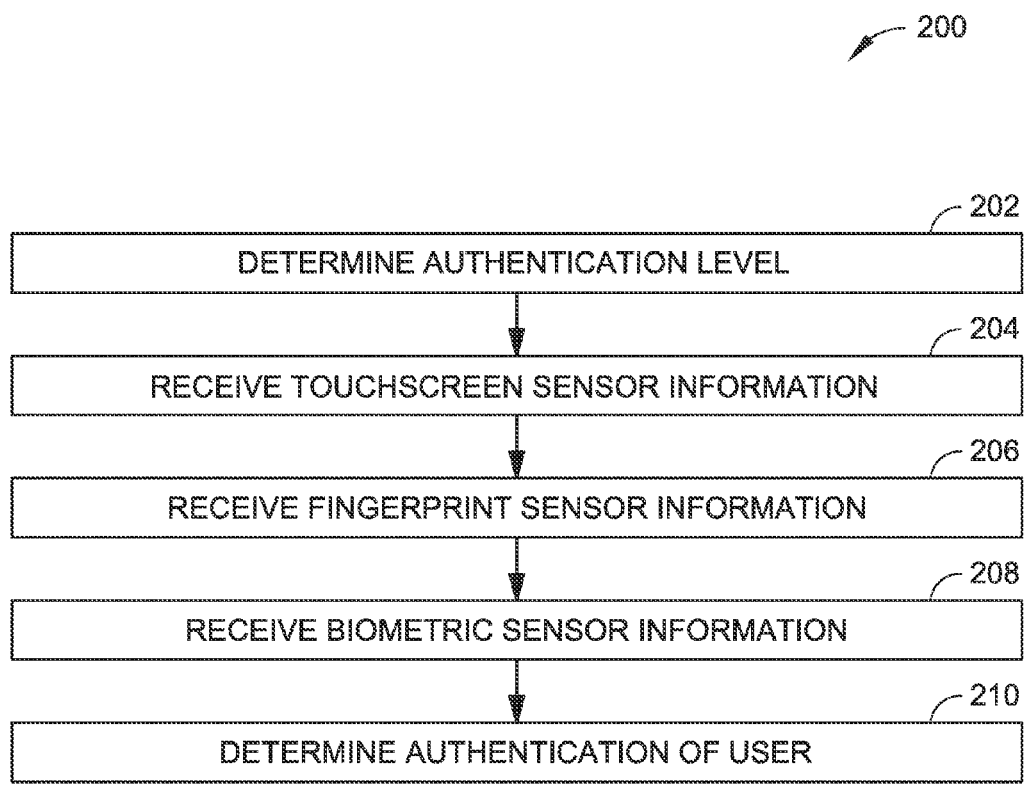
FIG. 2 is a flow diagram illustrating an example process for utilizing an increased authentication using a biometric sensor in a computing device and sensing device, such as the computing device and sensing device illustrated in FIGS. 1A through 1C.

FIG. 2 illustrates an example process 200 that employs a computing device and sensing device, such as the multi-factor authentication device 100 and the sensing device 102 shown in FIGS. 1A through 1E.

In the process 200 illustrated, an authentication level for using a computing device is determined (Block 202). In implementations, controller 112 can determine an authentication level necessary for using the multi-factor authentication device 100. For example, if a user desires to gain access the multi-factor authentication device 100, controller 112 can determine that a low level of authentication is required and only a touchscreen sensor 104 is needed. In another implementation, controller 112 can receive an indication that a user is attempting to access a banking application on the multi-factor authentication device 100 and can determine that a high and/or an increased level of authentication is required to operate the banking application. In this implementation, controller 112 can determine that a touchscreen sensor 104, a fingerprint sensor 110, and a biometric sensor 108 are required in order to achieve the additional level of authentication and prevent spoofing of the fingerprint sensor 110 and/or other unauthorized access. In some implementations, the controller 112 may determine that an additional authentication level is required (e.g., applications such as banking, commerce, etc.) and that multiple sensors (e.g., the fingerprint sensor 110, the biometric sensor 108, and/or the touchscreen sensor 104) are needed in order to receive the required authentication information. In some embodiments, a high level of authentication may require two or more sensors. In some embodiments, a low level of authentication may require only one or two sensors. Requirement of information from multiple sensors can provide higher authentication for a multi-factor authentication device 100 or other device and prevent spoofing and/or unauthorized access.

Next, touchscreen sensor information may be received from a touchscreen sensor (Block 204). In implementations, controller 112 can receive touchscreen sensor 104 information if the authentication level determined in the previous step requires information from the touchscreen sensor 104. For example, a user may desire access to the multi-factor authentication device 100, and controller 112 may determine that the touchscreen sensor 104 is needed to receive authentication information (e.g., a passcode, an indication of a finger swipe, etc.). The controller 112 can then receive information from the touchscreen sensor for comparing the received information with information in a database (e.g., memory 118). In one specific embodiment, the controller 112 can receive touchscreen sensor 104 information from touchscreen sensor 104 including an entered passcode for comparing the entered passcode with the predetermined passcode required to gain access to the multi-factor authentication device 100.

Fingerprint sensor information may be received from a fingerprint sensor (Block 206). In implementations, controller 112 can receive fingerprint sensor 110 information if the authentication level determined in the previous steps requires information from the fingerprint sensor 110. In an embodiment, a user may desire access to the multi-factor authentication device 100, and controller 112 may determine that the fingerprint sensor 110 is needed to receive authentication information (e.g., a fingerprint image, etc.). The controller 112 can then receive information from the fingerprint sensor 110 for comparing/matching the received information with information in a database (e.g., in memory 118). In one specific embodiment, the controller 112 can receive fingerprint sensor 110 information from fingerprint sensor 110 including a fingerprint image and compare the received fingerprint image with predetermined and/or preobtained fingerprint data in a database (e.g., in memory 118) that is required for authentication.

Biometric sensor information may be received from a biometric sensor (Block 208). In some implementations, controller 112 can receive biometric sensor 108 information if the authentication level determined in the previous steps requires information from the biometric sensor 108. In a specific embodiment, a user may desire access to a banking application on the multi-factor authentication device 100, and controller 112 may determine that the biometric sensor 108 is needed to provide authentication in order to access the banking application. The controller 112 can then receive information (e.g., the user's blood pulse signature and EKG signature, etc.) from the biometric sensor 108 for comparing/matching the received information with information (e.g., an authorized user's specific blood pulse signature and EKG signature, etc.) in a database (e.g., in memory 118). In another specific implementation, the controller 112 can receive biometric sensor information from a biometric sensor 108 including a voice recognition scan and compare the received information with information in a database (e.g., in memory 118) that is required for authentication.

Next, authentication is determined using biometric sensor information, fingerprint sensor information, and/or touchscreen sensor information (Block 210). Determining authentication can include using controller 122 to compare and/or match the received fingerprint sensor information, the received touchscreen sensor information, and/or the received biometric sensor information with predetermined information. If the received information and the predetermined information match, then the controller can grant access to the user. If the received information does not substantially match the predetermined information, then the controller 112 can deny access.

In an exemplary embodiment, a user can attempt to access a multi-factor authentication device 100 including a smartphone. As the user attempts to access the smartphone, a controller 112 can determine that a low level of authentication is required and that only information from a fingerprint sensor 110 and a touchscreen sensor 104 is needed to authenticate the user and grant access to the smartphone. The controller 112 then can receive touchscreen sensor information (e.g., a passcode, an indication of a finger swipe) from a touchscreen sensor 104 and can receive fingerprint sensor information (e.g., a digital fingerprint image). The controller 112 may compare the touchscreen sensor information and the fingerprint sensor information with predetermined touchscreen sensor information (e.g., a required passcode for access, an indication of a finger swipe) and predetermined fingerprint sensor information (e.g., an approved user's fingerprint image). If the touchscreen sensor information and the fingerprint sensor information match the predetermined touchscreen sensor information and the predetermined fingerprint sensor information, the controller 112 may grant access to the smartphone. Some other examples of low level authentication may include authentication for a game, access to a calendar software application, and/or access to an online media streaming software application. It is contemplated that other devices and/or software applications may require low level authentication.

In another exemplary embodiment, a user can attempt to access a health history software application on a multi-factor authentication device 100. As the user attempts to access the health history software application, a controller 112 can determine that a high level of authentication is required and that information from a fingerprint sensor 110, a biometric sensor 108, and a touchscreen sensor 104 is needed to authenticate the user and grant access to the health history software application. The controller 112 then can receive touchscreen sensor information (e.g., a passcode, an indication of a finger swipe) from a touchscreen sensor 104, biometric sensor information from a biometric sensor 108 (e.g., a retina scan, a user's pulse signature, an EKG signature), and fingerprint sensor information (e.g., a digital fingerprint image). The controller 112 may compare the touchscreen sensor information, the biometric sensor information, and the fingerprint sensor information with predetermined touchscreen sensor information (e.g., a required passcode for access, an indication of a finger swipe), predetermined biometric sensor information (e.g., an authorized user's retina scan, pulse signature, and/or EKG signature), and predetermined fingerprint sensor information (e.g., an approved user's fingerprint image). If the touchscreen sensor information, the biometric sensor information, and the fingerprint sensor information match the predetermined touchscreen sensor information, the predetermined biometric sensor information, and the predetermined fingerprint sensor information, the controller 112 may grant access to the health history software application. Some other examples of high and/or increased level authentication may include authentication for a banking and/or payment software application and/or file access on a device. It is contemplated that other devices and/or software applications may require a high and/or increased authentication level.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A mobile device configured to authenticate a user, comprising:
    an authentication sensing device, including
        a biometric sensor configured to receive biometric information from the user; and
        a fingerprint sensor configured to receive fingerprint information from the user, where the biometric sensor and the fingerprint sensor are disposed in a backside chip-on-glass configuration in an area of the authentication sensing device where optical and electrostatic sensing areas overlap; and
    a controller configured to authenticate the user, where the authentication sensing device, including
        the biometric sensor and the fingerprint sensor, is coupled to the controller.

2. The mobile device of claim 1, where the biometric sensor includes an optical biometric sensor.

3. The mobile device of claim 2, wherein the optical biometric sensor includes a pulse oximeter.

4. The mobile device of claim 1, where the biometric sensor includes at least one of a retina scanner or an iris scanner.

5. The mobile device of claim 1, where the biometric sensor includes a facial recognition sensor.

6. The mobile device of claim 1, where the biometric sensor includes a voice recognition sensor.

7. The mobile device of claim 1, where the biometric sensor includes a light source.

8. The mobile device of claim 1, where the fingerprint sensor is an electrostatic fingerprint sensor.

9. The mobile device of claim 1, where the authentication sensing device includes a backside chip-on-glass configuration.

10. An authentication system configured to authenticate a user, comprising:
    an authentication sensing device, including
        a biometric sensor configured to receive biometric information from the user;
        a fingerprint sensor configured to receive fingerprint information from the user, where the biometric sensor and the fingerprint sensor are disposed in a backside chip-on-glass configuration in an area of the authentication sensing device where optical and electrostatic sensing areas overlap; and a touchscreen sensor configured to receive input from a user; and a controller configured to determine an authentication level and authenticate the user, where the authentication sensing device, including the biometric sensor, the fingerprint sensor, and the touchscreen sensor, is coupled to the controller.

11. The authentication system of claim 10, where the biometric sensor includes an optical biometric sensor.

12. The authentication system of claim 11, wherein the optical biometric sensor includes a pulse oximeter.

13. The authentication system of claim 10, where the biometric sensor includes at least one of a retina scanner or an iris scanner.

14. The authentication system of claim 10, where the biometric sensor includes a facial recognition sensor.

15. The authentication system of claim 10, where the biometric sensor includes a voice recognition sensor.

16. The authentication system of claim 10, where the biometric sensor includes a light source.

17. The authentication system of claim 10, where the fingerprint sensor is an electrostatic fingerprint sensor.

18. The authentication system of claim 10, where the authentication sensing device includes a backside chip-on-glass configuration.

19. The authentication system of claim 10, where the authentication sensing device includes an integrated fingerprint sensor and touchscreen sensor.

20. A computer-implemented method, comprising:

determining an authentication level required for a mobile device, the mobile device including an authentication sensing device having at least two of a touchscreen sensor, a biometric sensor, or a fingerprint sensor;

receiving at least one of
touchscreen sensor information from the touchscreen sensor, the touchscreen sensor information based on a determined authentication level;
biometric sensor information from the biometric sensor, the biometric sensor information based on the determined authentication level; or
fingerprint sensor information from the fingerprint sensor, the fingerprint sensor information based on the determined authentication level, where the biometric sensor and the fingerprint sensor are disposed in a backside chip-on-glass configuration in an area of the authentication sensing device where optical and electrostatic sensing areas overlap; and determining authentication for the mobile device based on received sensor information.

* * * * *